United States Patent [19]

Ginter et al.

[11] Patent Number: 4,612,254

[45] Date of Patent: Sep. 16, 1986

[54] AROMATIC CARBOXYLIC ACID AND METAL-MODIFIED PHENOLIC RESINS AND METHODS OF PREPARATION

[75] Inventors: James W. Ginter, Cheektowaga; Donald H. Thorpe, Williamsville; Victor F. G. Cooke, Youngstown, all of N.Y.

[73] Assignee: Occidental Chemical Corporation, Niagara Falls, N.Y.

[21] Appl. No.: 709,461

[22] Filed: Mar. 7, 1985

[51] Int. Cl.$^4$ .................. C08G 8/32; C08L 61/14
[52] U.S. Cl. .................. 428/531; 346/210;
346/211; 346/212; 346/216; 346/217; 346/225;
428/327; 428/326; 524/509; 524/510; 524/595;
524/596; 525/506; 525/508; 528/139; 528/140;
528/144; 528/146; 528/147; 528/148
[58] Field of Search ............... 525/506, 508; 528/148,
528/139, 140, 144, 146, 147; 524/596, 509, 510,
595; 346/210, 211, 212, 216, 217, 225; 428/327,
326, 531

[56] References Cited

U.S. PATENT DOCUMENTS

| | | | |
|---|---|---|---|
| 3,485,797 | 12/1969 | Robins | 528/165 X |
| 3,624,038 | 11/1971 | Weidner | 528/148 X |
| 3,663,256 | 5/1972 | Miller et al. | 528/151 X |
| 3,737,410 | 6/1973 | Mueller | 525/504 |
| 3,767,449 | 10/1973 | Hayashi et al. | 117/36.2 |
| 3,772,052 | 11/1973 | Kimura et al. | 428/341 |
| 3,773,542 | 11/1973 | Hayashi et al. | |
| 3,857,721 | 12/1974 | Hayashi | |
| 3,874,895 | 4/1975 | Hayashi et al. | 428/219 X |
| 3,924,027 | 12/1975 | Saito et al. | 427/147 |
| 4,025,490 | 5/1977 | Weaver | 528/162 X |
| 4,036,816 | 7/1977 | Vasishth et al. | 528/165 X |
| 4,134,847 | 1/1979 | Oda et al. | 427/150 X |
| 4,165,102 | 8/1979 | Bodmer | 528/162 X |
| 4,173,684 | 11/1979 | Stolfo | 528/148 X |
| 4,216,299 | 8/1980 | Kikuga et al. | 525/506 X |
| 4,245,083 | 1/1981 | Reitz et al. | 525/508 X |
| 4,262,936 | 4/1981 | Miyamoto | 346/225 X |
| 4,263,047 | 4/1981 | Miyamoto et al. | 346/225 X |
| 4,379,897 | 4/1983 | Asano et al. | 525/506 |
| 4,400,492 | 8/1983 | Asano et al. | 525/506 |
| 4,461,495 | 7/1984 | Nakasato et al. | 346/211 |

FOREIGN PATENT DOCUMENTS 61-4358 2/1986 Japan .
61-4359 2/1986 Japan .

OTHER PUBLICATIONS

U.S. application Ser. No. 625,508, filed Jun. 24, 1984; in file of Japanese Disclosure No. 61-31286, published Feb. 13, 1986; Booth et al.

*Primary Examiner*—Howard E. Schain
*Attorney, Agent, or Firm*—James F. Tao; James F. Mudd

[57] ABSTRACT

Novel metal-modified phenolic resins useful in the color developer part of a carbonless copy paper system are disclosed, as well as methods for preparing such resins. The metal-modified phenolic resins are reaction products of an aromatic carboxylic acid and a partial condensation reaction product (an oligomer) of a phenol and an aldehyde. The metal-containing compound is added either to the mixture of phenol and aldehyde in forming the oligomer or to the mixture of aromatic carboxylic acid and the oligomer. The color developer materials of the invention are coated on a paper substrate which forms a part of a pressure sensitive recording paper system. The color developer materials exhibit improved performance over prior art colored developer materials.

74 Claims, No Drawings

AROMATIC CARBOXYLIC ACID AND METAL-MODIFIED PHENOLIC RESINS AND METHODS OF PREPARATION

BACKGROUND OF THE INVENTION AND PRIOR ART STATEMENT

This invention relates to certain novel metal-modified phenolic resins and to methods for preparing such resins. More particularly, the invention relates to novel metal-modified phenolic resins which are useful in the color developer part of a carbonless copy paper system.

Carbonless copy paper is widely used today, particularly in various business forms where one or more copies are needed. Carbonless copy paper is preferred over copies made by conventional carbon paper for a variety of reasons, including ease of handling and various expenses associated with the use of carbon paper. Carbonless copy paper is also particularly adapted for use in various computer generated documents.

As the name implies, a carbonless copy paper system generally consists of two or more sheets of paper: an original or top sheet on which an image may by formed by a pen, a typewriter, a printer, etc. The second sheet is the copy, on which a copy of the original image is generated. Generally, the backside of the top sheet or the original is coated with a color former coating, while the top side of the copy sheet is coated with a color developer coating. Typically, the color former coating comprises microcapsules of a normally colorless chromogenic material, such as Crystal Violet Lactone, and a solvent. These microcapsules are ruptured by the pressure applied during the formation of the image on the original, such as by the action of a pen or a typewriter, resulting in the localized release of the solution of the chromogenic material. The color developer coating, on the top surface of the copy sheet and facing the color former coating, typically contains a material which will react with the chromogenic material and solvent released by the color former microcapsules during the writing process to produce a visible image on the copy sheet. Such a carbonless copy paper system is disclosed, for example, in U.S. Pat. No. 2,712,507. One embodiment of the microcapsules containing the solution of chromogenic material is disclosed in U.S. Pat. No. 2,800,457.

It is also known to provide both the color former and color developer in a single coating coated on the side of the copy paper facing the original sheet. Such a so-called self-contained paper is disclosed in U.S. Pat. No. 2,730,457. The present invention is applicable to both these carbonless copy paper systems, but for purpose of discussion herein reference will be made to the commercially important two-coating system.

As indicated above, the color developer coating contains a material which will react with the released solution of chromogenic material to provide a visible image. Early color developer materials were acid clay-like materials such as attapulgite and zeolite materials or kaolin. See, e.g., U.S. Pat. No. 2,712,507. Subsequently, it was found that an improved color developer material may be obtained from a mixture of a phenolic polymer, such as a phenol-aldehyde polymer, commonly known as a novolak, with or without a clay material such as kaolin. See, e.g., U.S. Pat. Nos. 3,455,721 and 3,466,184. More recently, it has been found that the preferred phenolic polymers for use as color developers are those made with a para-substituted phenol. See, e.g. U.S. Pat. No. 3,663,256. Novolaks are known to be acidic and it is believed that the acid radicals in the novolaks interact with the color-forming chromogenic material to result in a colored material. However, an image so obtained has been shown by experience to have certain fading problem.

With the need in mind of a color developer which has a high speed of formation of the image, high image intensity, and long life or permanence of the image, it was found that the incorporation of a metal salt into the color developer gave improved results. See, e.g. U.S. Pat. Nos. 3,516,845 and 3,723,156. While said U.S. Pat. No. 3,723,156 discloses a color developer containing a metal salt whose anion contain at least four carbon atoms, such as zinc naphthenate or zinc 2-ethylhexanoate, U.S. Pat. No. 4,025,490 claims a method for producing a metal-modified phenol-aldehyde novolak resin which included the use of a metal salt whose anion contains 1–3 carbon atoms. U.S. Pat. Nos. 4,165,102 and 4,165,103 disclose that zinc modified phenol-aldehyde novolak resins for use as color developing agents can be prepared by reacting the phenolic resin with zinc oxide or zinc carbonate and an ammonium carboxylate salt such as ammonium benzoate or ammonium formate. Another refinement in the art of the color developer is disclosed in U.S. Pat. No. 3,737,410, which shows the modification of a para-substituted novolak resin with zinc dibenzoate and a weak base such as ammonium bicarbonate. It is believed that the weak base, such as an ammonium compound, serves to solubilize the metal salt present. However, it has been found that the performance of such a color developer fluctuated, depending on the efficacy of the color forming system employed.

Recent work on improving the color developer includes the use of an aromatic carboxylic acid, such as salicylic acid, in the color developer composition. Salicylic acid, though much more expensive than phenol, is alleged to give a much higher quality image when used in a color developer. Thus, U.S. Pat. No. 3,772,052 discloses a color developer comprising a metal compound of a polymer, the polymer being a reaction product of an aromatic carboxylic acid with an aldehyde. However, aside from the fact that salicylic acid is substantially more expensive than phenol, the polymerization reaction between salicylic acid and formaldehyde is also a slow and difficult one, as compared to the reaction of phenol and formaldehyde. Thus, more stringent conditions, such as by the use of large amounts of strong acid catalyst, are required for the polymerization reaction of salicylic acid and formaldehyde. In addition, since salicylic acid is relatively less soluble in many organic solvents, its use per se may retard the imaging speed of a color developer or a carbonless copy paper system.

U.S. Pat. No. 3,874,895 discloses a color developer comprising a mixture of an acidic polymer such as a phenolic polymer and an organic carboxylic acid or a metal salt of such an acid. U.S. Pat. No. 3,924,027 discloses an acceptor composition for a pressure sensitive copy system, which is a particulate mixture of an organic acid substance or a polyvalent metal salt of the acid substance and a polymer. U.S. Pat. No. 4,134,847 discloses a color developer which is a mixture of at least one aromatic carboxylic acid, at least one polymer, and at least one polyvalent metal oxide or carbonate. In these four patents, salicylic acid, if present, may be used as a component to be mixed with a polymer (such as in U.S. Pat. Nos. 3,874,895, 3,924,027 and 4,134,847) or may be reacted with formaldehyde to form the polymer in the color developer composition (such as in U.S. Pat. No. 3,772,052 and 3,874,895). In addition, mixtures of phenolic polymers and salicylic acid/formaldehyde polymers may be used (such as in U.S. Pat. No. 3,874,895).

In U.S. Pat. Nos. 4,173,684 and 4,226,962 there are disclosed metal-modified novolak resins prepared by reacting a para-substituted phenol, salicylic acid and formaldehyde to form a melted novolak resin, which is then mixed with a zinc salt to form the metal-modified novolak resin.

The use of zinc salicylate with phenolic resins is disclosed in U.S. Pat. No. 3,624,038. There, zinc salicylate is used as a catalyst in the condensation of phenol and formaldehyde to form a composition suitable for use as an adhesive.

The manufacture of phenolic resins containing a benzyl ether structure is known in the art of foundry resin binders such as disclosed in U.S. Pat. Nos. 3,485,797 and 3,676,392. The resins are made with metal salt catalysts such as zinc naphthenate, and stannous octoate. These resins generally have a high ratio of formaldehyde to phenol, characteristics of resole resins, when used in their final form as foundry sand binders. The resins are generally unsubstituted in the para-position, although para-substitution has been disclosed.

Canadian Pat. No. 927,041, and U.S. Pat. No. 4,036,816 and 4,045,411, disclose phenolic resins having the benzyl ether structure made with zinc catalysts, such as zinc formate and zinc acetate. Unsubstituted phenol is preferred as a reactant and the products, to be used as adhesives, have a high ratio of formaldehyde to phenol in their final form.

Although the color developers of the prior art provide acceptable carbonless copies, there is a commercial need for improved and economical color developers.

Accordingly, it is an object of the present invention to provide an improved and economical color developer for a carbonless copy paper system having high image intensity and high speed of image formation.

It is another object of this invention to provide a color developer which will form an image that is resistant to fading.

It is a further object of the invention to provide a novel metal-modified phenolic resin, for use as a color developer, that is readily emulsifiable or dispersible.

These and other objects of the invention will be apparent from the following description.

SUMMARY OF THE INVENTION

In accordance with the present invention, a novel metal-modified phenolic resin is provided which is a reaction product of an aromatic carboxylic acid with a partial condensation reaction product (an oligomer) of a phenol and an aldehyde. A metal-containing compound is added either to the mixture of phenol and aldehyde in forming the oligomer or to the mixture of aromatic carboxylic acid and the oligomer, depending on reaction conditions and catalysts employed.

The present invention also provides methods for preparing the novel metal-modified phenolic resins. Such resins are prepared by first reacting a phenol, preferably a para-substituted phenol, with an aldehyde, with or without a polyvalent metal compound, to obtain a partial condensation reaction product or oligomer. The oligomer is then reacted with an aromatic carboxylic acid, and a polyvalent metal compound if one was not initially used, to form the condensed resin product.

DETAILED DESCRIPTION OF THE INVENTION

The present invention provides novel metal-modified phenolic resins which are useful as color developers in carbonless copy paper systems, and methods for making the novel resins.

As indicated above, salicylic acid/formaldehyde polymer is not very soluble in the organic solvents normally used in a carbonless copy paper system. Since the salicylic acid/formaldehyde polymer is intended to be the color developer component, and since the color developer must be solubilized by the solution of color former that is released by the rupture of the microcapsules in order for the reaction between color developer and color former to take place, the low solubility or slowness in solubilizing the color developer polymer would delay or hinder the image forming process. In addition, the reaction between salicylic acid and formaldehyde is a relatively difficult one. Thus, the salicylic acid/formaldehyde polymer is an expensive material both because salicylic acid is an expensive raw material and because the polymer is difficult to prepare.

There are also substantial disadvantages associated with the phenol/salicylic acid/formaldehyde resin disclosed in U.S. Pat. No. 4,173,684 and 4,226,962. In the first place, the formaldehyde reacts readily with the phenol but only reacts with salicylic acid under more stringent conditions. Thus, when all 3 reactants are initially present in a reaction vessel, the formaldehyde will selectively react with the phenol first. This competition for the available formaldehyde may leave some of the salicylic acid unreacted and results in a product having some of the characteristics of the physical mixtures of phenolic polymer and salicylic acid disclosed in the prior art. Another major disadvantage of the phenol/salicylic acid/formaldehyde resin of U.S. Pat. Nos. 4,173,684 and 4,226,962 resides in the fact that such a resin is only difficultly, if at all, emulsifiable. Thus, Example 1 of U.S. Pat. No. 4,173,684 shows dissolving the resin in toluene and applying the solution to a paper. However, the coating of paper with such a solution is undesirable because the paper tends to absorb the solvent and, with it, a large amount of the resin. This makes it difficult to control the amount of the coating on the paper.

In commercial practice, it is highly desirable to coat the color developer coating to the paper as an emulsion or dispersion.

The color developers are generally made into a dispersion of the metal modified phenolic resin in water, usually containing about 50 weight percent resin. This dispersion is mixed with dispersions of other components such as clays, starch, rubber, and the like to form a coating slurry that generally contains about 30 to 50 weight percent solids. The slurry contains about 10 to 18 weight percent resin based on the weight of solids in the slurry. Thus the resin content of the slurry is about 3 to about 10 weight percent based on the total weight of slurry. The coating slurry is coated on a substrate such as paper and dried to produce a dry coating containing about 10 to 18 weight percent of resin. This dry coated paper is known as the record sheet or copy sheet.

The color developer dispersions generally have been formed by grinding dry phenolic resin to small particle size by suitable means such as a ball mill, and then mixing the particles in water with additives such as surfactants, wetting agents, and the like. The grinding operation requires a rather high capital investment in grinding equipment. Ball mills for this purpose use stainless steel balls that are very expensive and wear out quickly. A large amount of heat is generated by the grinding action in the ball mill. This heat must be controlled. There is also added energy costs. A high percentage of the particle size reduction is accomplished in the early part of the grind cycle, the remaining size reduction requires the remainder of the time. Long grinding cycles are required.

Accordingly, there is a need to form an emulsion of the color developer resin from the liquid or molten resin as produced without going through a solid phase that must be ground. This type of process has been disclosed in U.S. Pat. Nos. 4,115,327 and 4,124,554, with respect to resins that are not modified with metals. The latter patent uses a solvent, which is objectionable on environmental reasons.

In the prior art, there is no disclosure of emulsifying the metal modified phenolic resin color developers.

The present invention alleviates the disadvantages of the prior art color developer resins. This is done by first reacting the phenol with the aldehyde in a partial condensation reaction to obtain an oligomer having one or more reactive groups thereon. An aromatic carboxylic acid is then added to the oligomer to react therewith. It is believed that the process of the invention consumed most of the reactive phenol in the oligomer and yet leaves reactive groups on the oligomer for the acid to be attached. In this manner, a resin product is obtained which possesses good solubility and emulsifiability as well as high imaging speed and intensity. The additional of a suitable metal further imparts fade resistance to the product. In adding the metal, the resins of the present invention also do not require the use of the usual metal carboxylate and ammonium compounds.

In accordance with the present invention, a phenol, preferably a para-substituted phenol, is first reacted with an aldehyde to form a partial or intermediate condensation reaction product. The partial condensation reaction product or oligomer is believed to be a mixture containing different molecules, with each molecule containing one or more phenol groups or radicals and one or more hydroxy alkyl groups or alkylene ether groups. Preferably, the partial condensation reaction is carried out under conditions which results in, on average, no more than about one to four phenol groups for each of the molecules of the oligomer or partial condensation reaction product.

The partial condensation reaction product or oligomer is then reacted with an aromatic carboxylic acid, preferably a salicylic acid. Other aromatic carboxylic acids that may be used include certain hydroxy benzoic acids and hydroxy naphthalic acids. A polyvalent metal compound may be introduced into the mixture forming the oligomer or into the mixture forming the final phenolic resin, depending on reaction conditions and catalysts employed, as will be more fully described below.

The novel metal-modified phenolic resins of the present invention are found to be more economically made and to have improved utility as color developers when tested against the novolak resins of the prior art.

The phenols useful in the practice of this invention are known to those skilled in this art and are disclosed, for example, in U.S. Pat. Nos. 3,455,721 and 4,173,684. Preferably, the phenol is a parasubstituted phenylphenol or alkyl phenol. Most particularly preferred phenols are para-butylphenol, para-octylphenol, and para-nonylphenol. Mixtures of phenols can be used. The preferred aldehyde is formaldehyde. Other aldehydes having up to 8 carbon atoms can also be employed, such as acetaldehyde, propionaldehyde, benzaldehyde, and the like. Various typical phenol-aldehyde combinations suitable for the practice of this invention are disclosed in U.S. Pat. No. 4,025,490.

The partial or intermediate condensation reaction of the phenol with formaldehyde may be conducted under conditions to favor the formation of an oligomeric resole-type molecule or a benzyl ether-type of molecule. For purposes of convenience, either of the partial condensation reaction products, i.e., the oligomeric resole-type molecule or benzyl ether-type molecule, may be referred to herein as the "oligomer". By the term "oligomeric resole-type molecule" is meant a molecule believed to have the general structure of a resole, and containing on average from about one to ten phenol groups and having at least one hydroxy methyl group in the ortho position of one of the phenol groups. When two or more phenol groups are present in the oligomeric resole-type molecule, the two phenol groups are believed to be connected to each other at the ortho position by a dialkylene ether group: a dimethylene ether group when formaldehyde is used as the aldehyde. By the term "oligomeric benzyl ether-type of molecule" is meant a molecule believed to have the general structure of an ether, and containing on the average about one to ten phenol groups, with a dialkylene ether group linking the phenol groups in the ortho position. When formaldehyde is used as the aldehyde, a dimethylene ether group is present. It is to be understood that when conditions are employed to favor the formation of either type of oligomer, certain amounts of the oligomer of the other type are probably formed as well. The preferred oligomer contains on the average about one to four phenol groups.

Suitable polyvalent metal compounds are known in the art and are disclosed, for example, in U.S. Pat. Nos. 3,516,845, 3,924,027, and 4,173,684. Suitable polyvalent metals include zinc, cadmium, calcium, magnesium, aluminum, chromium, cobalt, nickel, copper, indium, and divalent tin. Suitable anions for the polyvalent metal compounds include organic and inorganic anions such as oxides, hydroxides, carbonates, silicates, acetates, alkenoates, etc. A particularly preferred polyvalent metal compound is zinc oxide.

Suitable salicylic acids are also known to those skilled in the art, and are disclosed, for example, in U.S. Pat. No. 4,134,847. Preferably, unsubstituted salicylic acid is used.

The amount of the polyvalent metal compound used may be varied. Typically, it may be used in an amount corresponding to about 0.5 to 10% by weight of metal on the basis of the amount of phenol and salicylic acid employed. Preferably, the polyvalent metal compound is employed in an amount corresponding to about 2 to 5 weight percent of metal on the basis of the phenol and salicylic acid employed.

The amount of salicylic acid to be used may also be varied. It has been found that between about 1 to about 25% of salicylic acid may be used, based on the weight of the phenol and salicylic acid used. Less than about 1% salicylic acid would give little effect, while more than 25% salicylic acid would not increase the effectiveness of the color developer resulting therefrom. Preferably, the salicylic acid is used in an amount between about 5 to 20%, and most preferably between about 10 to 18%, based on the weight of the phenol and salicylic acid used.

The reaction between the oligomer and the metal compound and salicylic acid is not understood. It is believed that a polymeric or condensation material is formed having therein phenol groups and salicylic acid groups, which are connected through alkylene groups, such as methylene groups, at the ortho positions of the alkylphenol and at the ortho and para positions of the salicylic acid. The metal ion from the metal compound is believed to be chelated into the polymeric material or resin, primarily attaching to the salicylic acid groups in the resin.

The phenolic resins of the invention are preferably prepared by the following processes depending upon the choice of catalysts employed for the resin preparation.

Process I

The metal modified phenolic resins employed in this invention can be prepared by first reacting a suitable phenol with an aldehyde in the presence of a catalytic amount of an alkaline compound to produce an oligomeric composition which is a heat reactive, resole-type phenolic resin comprising a mixture of a para-substituted hydroxybenzyl ether, a para-alkyl substituted hydroxy-methyl phenol and possibly some methylene-linked para-substituted phenols. The para-substituted components are usually para-alkyl substituted components. This oligomeric material is then reacted with a hydroxy benzoic acid, preferably a salicylic acid, and a metal-containing compound to provide a metal modified phenolic resin having a predominance of novolak structure in which the salicylic acid and the metal oxide form part of the resin structure. It is believed that the salicylic acid is chemically bonded to the phenolic novolak structure to form a polymer of the para-substituted phenol, the salicylic acid, the methylene groups from the aldehyde, and the metal.

Suitable alkaline catalysts include alkali metal hydroxides, such as the hydroxides of sodium, potassium, rubidium and cesium, the alkaline earth metal oxides, such as the oxides of calcium, barium, strontium, zinc and magnesium, and tertiary amines such as trialkylamines, wherein the alkyl group has 1 to 8 carbon atoms. Illustrative examples are triethylamine, tributylamine, trihexylamine, trioctylamine and diethylmonobutylamine. Aqueous solutions of trimethylamine can be used. Triethylamine is preferred. The amines have the advantage of leaving no inorganic salts remaining in the resin.

Process II

The metal-modified phenolic resins employed in this invention can also be prepared by first reacting a suitable phenol with an aldehyde in the presence of a catalytic amount of a metal salt to produce an oligomeric composition which is a heat reactive, benzyl ether-type phenolic resin comprising a mixture of a para-substituted hydroxybenzyl ether, a para-substituted hydroxymethyl phenol and possibly some methylene-linked para-substituted phenols. The para-substituted components are usually para-alkyl substituted components. Thereafter, this oligomeric composition is reacted with a hydroxy benzoic acid, preferably a salicylic acid, and a metal-containing compound to provide a metal modified phenolic resin having a predominance of novolak structure in which the salicylic acid and the metal form part of the resin structure. It is believed that the salicylic acid is chemically bonded to the phenolic novolak structure to form a polymer of the para-substituted phenol, the salicylic acid, the methylene groups from the aldehyde, and the metal. Preferably, the metal-containing compound is introduced to the reaction mixture in the first step of the process in sufficient quantity, to provide the metal salt when reacted with an acid, and to provide the metal required in the second step of the process. The catalytic metal salts used in this process can be provided by reacting a metal compound such as metal oxide, or its functional equivalent, with an acid. The metal salts can be pre-formed and added to the reaction mixture as the salt. Alternatively, the metal compound and acids can be added directly to the reaction mixture.

The metal compound can be any of the metal oxides disclosed below. Typical of the acids are the carboxylic acids of 1 to about 12 carbon atoms, such as formic, acetic, propionic, as well as the higher carbon acids such as 2-ethyl hexoic, and the like. Salicylic acid can also be employed as the acid. Hydrochloric acid, para-toluene sulfonic acid can also be employed.

As the metal oxide used in accordance with the present process, any inorganic oxide of copper, aluminum, zinc, chromium, indium, tin, cadmium, cobalt and nickel can be employed including (as a less preferred embodiment of the invention) the hydrates of said metal oxide. Representative examples of suitable oxides include the following:

copper: $Cu_2O$; $CuO$
aluminum: $Al_2O_3.H_2O$; $Al_2O_3. 3H_2O$
zinc: $ZnO$; the mineral zincite
cadmium: $CdO$; $Cd_2O$
chromium: $Cr_2O_3$; $Cr_2O.H_2O$; $CrO$; $CrO_3$; $CrO_2$
indium: $In_2O_3$; $In_3O_4$; $InO$
tin: $SnO$; $SnO_2$
cobalt: $CoO$; $CO_2O_3$
nickel: $NiO$; $Ni_2O_3$; $Ni_3O_4$; $Ni_3O_4.H_2O$ Mixtures of these metal oxides can be employed also.

In place of the metal oxide or hydrate thereof, according to a less preferred embodiment of the invention, there may be employed a functional equivalent of the metal oxide. By functional equivalent is meant any inorganic compound of any of the aforementioned metals, e.g. a hydroxide or a carbonate of the metal, which is known to form the corresponding metal oxide on heating at the elevated temperature employed in the present process (as discussed more particularly below). For example, $Zn(OH)_2$ or $ZnCO_3$ which are known to form $ZnO$ on heating at a temperature corresponding to that employed in the present process can be charged in the present process as the functional equivalent of a zinc oxide reactant. Functional equivalents of the metal oxide further include metal particles, such as metal dust, which when subjected to the reaction conditions forms the metal salts. Hereafter reference to "metal oxide" in this specification shall mean "metal oxide or its functional equivalent".

In the practice of the present invention it is much preferred to employ a metal oxide wherein the metal is in the positive oxidation state of two. The metal oxide is especially a dipositive zinc compound, particularly zinc oxide.

Process Conditions and Proportions—Process I

The first step of one preferred process of the invention involves the reaction of the para-substituted phenol and other phenols, if any, with the aldehyde in the presence of an alkaline catalyst. This step in the process of the invention is generally carried out at a pH of greater than 7, preferably about 8 to 10. The reaction temperature is in the range of about 65° to 100° C. The proportion of aldehyde to total phenols is in the range of about 0.6 to 2, preferably about 0.6 to 1.

At the end of the condensation of the formaldehyde with the phenols, the reaction mixture may be neutralized to a pH of about 4 to 5 with the addition of an acid such as toluene sulfonic acid, sulphuric acid, hydrochloric acid, oxalic acid, and the like. Then the salicylic acid and the metal compound are introduced to the reaction zone. The proportion of salicylic acid to total phenols including salicylic acid, is in the range of about 5 to about 25 weight percent, preferably about 10 to about 18 weight percent. The metal compound, preferably zinc oxide, is employed in an amount to provide about 0.5 to 5 weight percent of metal based on the solid color developer resin. The amount of zinc oxide required to provide the metal content is in the range of about 0.65 to about 5.6 weight percent.

Following the introduction of the salicylic acid and the metal compound, the reaction mixture is dehydrated, to about 120° C. under atmospheric pressure. An exothermic reaction occurs. Then vacuum is applied until the temperature rises to about 150°–165° C. The ratio of formaldehyde to phenol in the final metal-modified phenolic resin is about 0.5 to 1, preferably about 0.7 to 0.9. The resin has a predominantly novolak structure.

After completion of dehydration of the resin, water, emulsifiers and protective colloids are added to the resin to provide an emulsion that is suitable for mixing with other coating ingredients, such as clays, starches and adhesives to obtain a coating slurry suitable for coating of paper and other substrates for use in carbonless copy paper systems.

Process Conditions and Proportions—Process II

The first step of another preferred process of the invention involves the reaction of the para-substituted phenol and optionally other phenols, including hydroxy benzoic acid, with the aldehyde in the presence of at least a catalytic amount of a metal salt. This step in the process of the invention is generally carried out at a pH of about 4 to 7 and at a temperature in the range of about 90° to 100° C. The proportion of aldehyde to total phenols is in the range of about 0.6 to 2, preferably about 0.6 to 1. As indicated hereinbefore, the metal salt can be added directly to the reaction mixture as a metal oxide and an acid compound. Generally an excess of metal oxide is added over the amount required to form the metal salt. Sufficient excess metal oxide is conveniently added to provide the amount of metal desired in the metal modified phenolic novolak resin. Addition of all the metal oxide at the beginning of the reaction provides for better dispersion of the metal oxide during later stages of the process. Alternatively, only enough metal oxide need be added at the beginning of the reaction to provide the metal salt catalyst. The remainder of the metal oxide to provide the metal modified phenolic novolak resin product can be added at later stages of the process. The metal compound is introduced to the reaction zone in an amount to provide about 0.5 to 5 weight percent of metal based on the solid color developer resin. The amount of zinc oxide required to provide the metal content is in the range of about 0.65 to about 5.6 weight percent.

The proportion of acid catalyst is in the range of about 0.5 to about 5 based on the weight of alkyl phenol. The resulting product is an oligomeric phenolic resinous composition comprising a mixture of a para-substituted hydroxybenzyl ether, a para-substituted hydroxymethyl phenol and possibly some methylene-linked para-substituted phenols.

In the second step of this process of the invention a hydroxy benzoic acid, preferably a salicylic acid, is added to the oligomeric composition prepared in step (1). Prior to the introduction of the salicylic acid, the pH of the oligomeric composition may be adjusted, if desired, to about 7 to 9, by the addition of an alkaline material such as an alkali metal hydroxides such as sodium hydroxide. However, higher and lower values of pH can prevail. The salicylic acid is employed in a proportion of salicylic acid to total phenols including salicylic acid of about 5 to about 25 weight percent, preferably about 10 to about 18 weight percent. After the addition of the salicylic acid, the pH of the reaction mixture generally decreases to the range of about 4 to 7. During this and subsequent stages of the process, the salicylic acid reacts into the resin in such a way as to provide a predominantly phenolic novolak structure. Zincated salicylic acid is nuclear substituted on its own ring to become part of the novolak chain.

Following the addition of salicylic acid, the reaction mixture is dehydrated, first under atmospheric pressure to a temperature of about 120° C. Then vacuum is gradually applied until the temperature rises to a range of about 140° to about 180° C.

After completion of dehydration of the resin, water and emulsifiers and protective colloids can be added to the resin to provide an emulsion that is suitable for mixing with other coating ingredients, such as clays, starches and adhesives to obtain a coating slurry suitable for coating of paper and other substrates for use in carbonless copy paper systems.

The Emulsion Process

The resin emulsions of the invention are preferably prepared by a process wherein a solution of a first emulsifying agent and water are added to the resin in molten conditions. The addition is preferably made to the molten resin at an elevated temperature following dehydration in a reaction zone equipped with reflux condenser. The added water serves to cool the molten resin, to introduce the emulsifying agent in a uniform manner to the resin, and to provide sufficient water to assist in the later stages of the emulsion preparation. The resulting emulsion is a water-in-oil emulsion wherein droplets of water are dispersed in a continuous resin phase.

To the water-in-oil emulsion is added a second emulsifying agent such as polyvinyl alcohol and stirred to obtain a uniform mixture. During the addition and mixing states, the water-in-oil emulsion inverts to an oil-in-water emulsion. The preferred second emulsifying agent is an aqueous solution of polyvinyl alcohol.

After sufficient blending of the second emulsifying agent, a relatively large quantity of hot water is added to dilute the resin to provide the desired resin solids content and final viscosity of the emulsion.

Suitable first emulsifying agents are anionic emulsifying agents such as sodium lauryl sulfate and sodium alpha-olefin sulfonate, and non-ionic emulsifying agents, such as poly-ethoxylated-para-nonyl phenol, and poly-ethoxylated-para-octyl phenol.

The emulsifying agent is preferably employed in a proportion of about 0.25 to about 2.5 weight percent based on the weight of molten phenolic resin. Accompanying the emulsifying agent is water in a proportion of about 5 to 25 weight percent, preferably about 10 to 20 weight percent, and more preferably about 12 to 18 weight percent based on the weight of molten resin.

Suitable second emulsifying agents are polyvinyl alcohol and cellulose derivatives, such as hydroxyethyl cellulose, hydroxy propyl cellulose and methyl cellulose.

The second emulsifying agent is employed in a proportion of about 3 to 10 weight percent, preferably about 4 to 8 and more preferably about 5 to 6 weight percent based on the weight of molten resin. Accompanying the second emulsifying agent is additional water in a proportion of about 5 to 30 weight percent, preferably about 10 to 20 weight percent based on the weight of molten resin. The proportion of polyvinyl alcohol in water solution employed is generally in the range of about 15 to 50 weight percent polyvinyl alcohol based on the weight of water.

The total water content of the emulsion at the point of inversion should be in the range of about 24 to 35, preferably about 27 to 31 percent. The resin solids content of the final emulsion is generally in the range of about 40 to 50 weight percent based on the weight of emulsion.

The viscosity of the emulsion is generally in the range of about 500 up to 3000 to 4000 centipoises.

An alternative to the above-described inversion process for emulsification is the direct process of emulsification which is a method wherein molten resin is added to a hot, stirring mixture of water and emulsifiers. This is opposite to the inversion route wherein the emulsifiers, water, and the like are added to the resin. One or more additions of emulsifier are employed during resin addition so that resin entering the emulsification zone will be subject to a more uniform concentration of emulsifier. Alternately, a system wherein emulsifier is fed continuously and simultaneous with resin addition can be used and is preferred.

The emulsions prepared by the foregoing process are blended with suitable coating ingredients such as clays, starches and adhesives to obtain a coating slurry suitable for coating of paper and other substrates for use in carbonless copy paper systems. Typical coating slurry formulations are described in U.S. Pat. No. 4,025,490.

As indicated above, the reaction between the oligomer and the salicylic acid is not understood. It is known that a phenol will generally react much more readily with formaldehyde than a salicylic acid with formaldehyde. Thus, when nearly stoichiometric quantities of phenol and salicylic acid are mixed with formaldehyde, the phenol and salicylic acid compete for the available formaldehyde, resulting in some unreacted or free salicylic acid in the reaction product. This is shown, for example, by the relatively larger amounts of free salicylic acid present in the novolak resins of U.S. Pat. No. 4,173,684, as compared to that of the present invention. It is believed that the improved results obtainable by the novel resins of the present invention are due to improved incorporation of the salicylic acid radical into the resin. It is further believed that the improved incorporation of the salicylic acid radical in the present resin is due to the presence of very reactive hydroxy methyl groups or methylene ether groups in the oligomers or the partial condensation reaction products. These reactive groups are available for reaction with the salicylic acid without competition from the phenol, while in the composition of U.S. Pat. No. 4,173,684 the salicylic acid competes with phenol for reaction with the formaldehyde.

The invention will now be further described with reference to the following specific examples. It is to be understood that these examples are only illustrative of the invention and that variations and modifications may be made without departing from the spirit and scope of the invention. In these examples, all parts are by weight unless otherwise indicated.

The coated papers produced in these examples were tested as a record sheet by placing the coated surface thereof in contact with the coated side of a paper coated with microcapsules containing an oil solution of Crystal Violet Lactone. This sheet couple was imaged with an electric typewriter using a key with a grid pattern, and the initial intensity of the image was measured as the ratio of the reflectance of the imaged area to the reflectance of the unimaged background, after an elapsed time of twenty minutes. Thus, the more intense or darker images show as lower values, and higher values indicate weak or faint images. This test is called Typewriter Intensity (T.I.) and may be expressed mathematically as: T.I. = 100 Ri/Ro) where Ri is reflectance of the imaged area and Ro is reflectance of the background (unimaged) area as measured with a Gardner Laboratory Inc. XL 20 Colorimeter.

Print speed was measured by imaging by one pass through a pair of calender rolls, with image intensity measured after one minute development time. The lower the value reported, the faster the print speed.

Storage stability (decline) of the coated papers was determined by a three-hour exposure of the coated side of the paper to ultraviolet light in a Fadeometer followed by imaging and determination of typewriter intensity.

Fade resistance (fade) was measured by loss of image intensity upon 3 hours exposure of an imaged area to ultraviolet light, again using a Fadeometer.

Storage stability in the presence of residual solvent (solvent decline) of the coated papers was determined by one hour exposure of the samples to a toluene saturated atmosphere at room temperature (20° C.) followed by imaging and determination of typewriter intensity.

EXAMPLES 1 to 4

Color developer resins were produced in accordance with the present invention using the components listed in Table 1.

In Example 1, a reactor was charged with para-nonylphenol, Calsoft F, formalin and triethylamine. The mixture was heated to reflux for 3 hours, at which time analysis indicated that the formaldehyde content was less than 1%. The resulting oligomer or intermediate phenolic resinous composition was a heat reactive, resole phenolic resin. The resin was analyzed by Carbon 13-NMR spectroscopy and found to contain 70 mole percent methylol structure ($ArCH_2OH$) and 30 mole percent benzyl ether structure ($ArCH_2OCH_2AR$).

Zinc oxide and salicylic acid were added to the stirred reaction mixture, which was then heated at atmospheric pressure to 145° C. to react the zinc oxide and salicylic acid with the resole formed in the first step. Vacuum was then applied and the temperature raised to 160° to 165° C. to remove volatiles and complete the reaction. No condensate of salicylic acid was observed to collect on the apparatus during stripping. The resin at this point was clear, and had a melting range of 72° to 82° C. The resin was analyzed by Carbon 13-NMR spectroscopy which showed no absorbance bands indicative of methylol or benzyl ether structures.

Under reflux, a solution of Siponic F-300 emulsifying agent in water was added to the molten resin. (Siponic F-300 is a polyoxyethylated octylphenol. Siponic F-300 has 70 percent dry weight in water.) The resin cooled down to about 90°-100° C. Stirring was continued until a homogeneous paste was obtained. A hot 25% aqueous solution of Gelvatol 20-30 polyvinyl alcohol was then added and mixed for 15 minutes at 90° to 100° C. Inversion of the water-in-oil emulsion to an oil-in-water emulsion occurred during this step. Finally, hot water was added and rapid stirring continued for 15 minutes, before the emulsion was cooled to room temperature. The emulsion of Example 1 had the properties shown in Table 1.

In Example 2, the procedure was the same as for Example 1. The base resin had a melting range of 72° to 84° C., and a Ball and Ring softening point of 105° C. The properties of the emulsion are shown in Table 1.

In Example 3 the procedure was the same as for Example 1 except that ammonia was added before the water to reduce the viscosity of the emulsion. The base resin had a melting range of 74°-83° C., and a Ball and Ring softening point of 102° C. The properties of the emulsion are shown in Table 1.

In Examples 4, a resin was produced using the procedure of Example 1. The resulting resin had a melting range of 81°-91° C., and a Ball and Ring softening point of 110° C.

Percent insolubles in toluene was determined on the resin by dissolving a sample of resin in toluene at ambient temperature and weighing the residue. 0.08 weight percent of the resin was insoluble in toluene.

Percent free salicylic acid and/or salicylate was determined by High Pressure Liquid Chromatography (HPLC) using duPont Column C8 at ambient temperature, calibrated with pure salicylic acid. 0.7 weight percent free salicylic acid/salicylate was found.

EXAMPLES 5 to 11

Color developer resins were produced in accordance with the present invention using the components listed in Table 2.

In Example 5, p-nonylphenol, zinc oxide, Calsoft wetting agent and propionic acid were charged to a reactor and heated to 95°-100° C. with stirring. The formalin solution was added slowly, at such a rate to maintain reflux. The reflux was continued until the formaldehyde content had dropped to less than 1%. A measurement of pH (resin sample dissolved in 2 parts of acetone and 4 parts of water) at this point indicates a value of approximately 6.5. The resulting oligomer or intermediate phenolic resinous composition was a heat reactive, benzyl ether-type phenolic resin.

Then aqueous sodium hydroxide was added and mixing continued for 5 minutes, after which time the pH was 8.1. The salicylic was then added, and after mixing for a further 10 minutes the pH had dropped to about 4.5. The resin was dehydrated at atmospheric pressure to a temperature of 120° C. Full vacuum was then slowly applied (approximately 28 in of mercury) and dehydration continued to a temperature of 160° C. No sublimate of salicylic acid was observed during stripping. The final resin was clear, and had a melting range of 80°-90° C. and a Ball and Ring softening point of 100°-110° C.

The reactor was set for reflux, and the water (I) and Siponic F-300 were added slowly to cool the resin to about 95° C. via reflux. After a smooth paste was obtained, hot (85°-95° C.) polyvinyl alcohol solution was added and the stirred mixture held at 92°-96° C. for 30 minutes, or until the mixture had inverted to an oil-in-water emulsion, as indicated by conductivity measurements. Finally the hot (90°-95° C.) water was added and stirring continued for 15 minutes at 92°-96° C. to insure homogeneity. The final properties of the emulsion are shown in Table 2.

In Example 6, the procedure was the same as for Example 5. The final properties of the emulsion are shown in Table 2.

In Example 7, the procedure was the same as for Example 5. The final properties of the emulsion are shown in Table 2.

In Example 8, the procedure was the same as in Example 5, except that 1.06 parts of triethylamine was added dropwise at 90° C. to the stirred emulsion before the final emulsion was cooled, to reduce the viscosity of the emulsion. The final properties of the emulsion are shown in Table 2.

In Example 9, the procedure of Example 5 was employed. The final properties of the emulsion are shown in Table 2.

In Example 10, five samples were taken for infra-red analysis at the points in the process denoted by Sample Numbers. P-nonylphenol, zinc oxide, Calsoft wetting agent and propionic acid were charged to a reactor and heated to 95°-100° C. with stirring. The formalin solution was added slowly, at such a rate to maintain reflux. The reflux was continued until the formaldehyde content had dropped to less than 1%. The resulting intermediate phenolic resinous composition was a heat reactive, benzyl ether phenolic resin. (Sample 10-1 was taken.)

Then aqueous sodium hydroxide was added and mixing continued for 10 minutes. The salicylic acid was then added, and mixing was continued for a further 10 minutes. (Sample 10-2) The resin was dehydrated at atmospheric pressure to a temperature of 120° C. (Sample 10-3) Full vacuum was then slowly applied (approximately 28 in of mercury) and dehydration continued to a temperature of 160°-165° C. (Sample 10-4 was taken upon reaching 165° C. and full vacuum; Sample 10-5 was taken after one hour hold at 165° C.) The final resin was clear, and had a melting range of 73°-83° C. and Ball and Ring softening point of 108° C.

Example 11 exemplifies the direct process of emulsification using a resin of the benzyl ether type. 900 g of p-tert-octylphenol, 25 g of salicylic acid, 10 g of zinc oxide and 1.0 g of Calsoft F wetting agent were charged to a flask equipped with reflux condenser, mechanical stirrer and thermometer. The mixture was stirred and heated to 90°-100° C. at which time the slow addition of 197 g of 50% formalin was begun. Reflux was maintained for a period of 90 minutes during which time the formaldehyde is substantially consumed. The equipment was set for distillation, and the resinous mixture dehydrated to 200° C. and held for a period of 10 minutes. A sample of this material, when cooled was clear and exhibited a melt range of 64°-73° C., Ball and Ring softening point of 90° C., and a pH (1 resin/2 acetone/2 water) of 6.77.

Another flask was charged with a mixture of 357 g of water, 112 g of 25% polyvinyl alcohol solution and 4.5 g of sodium alpha-olefin sulfonate, and was heated with stirring to 85°-87° C. on a steam bath. During this charging and heating stage, the resin was allowed to cool to approximately 120° C. at which time the resin was slowly added to the stirring mixture of emulsifiers and water. When 175 g of the resin had been added, a second solution of 4.5 g of sodium alpha-olefin sulfonate dissolved in 5.0 g of water was charged to the stirring mixture. An additional 105 g of resin was charged to the stirring mixture in the same manner as the first. When all the resin had been added, the mixture was maintained with stirring for 10 minutes in excess of 90° C. Cooling was applied until the temperature of the white, creamy mixture was less than 40° C., at which time it was discharged from the flask.

This dispersion of spherical resin particles in water was found to exhibit a Brookfield viscosity of 5600 cp, pH of 5.9, solids content at 105° C. of 38.3% and an average particles size of 4.0 microns via Coulter Counter analysis.

TABLE 1

| Example No. | 1 | 2 | 3 | 4 |
|---|---|---|---|---|
| Formulation (parts) | | | | |
| para-Nonylphenol | 85.00 | 85.00 | 85.00 | 85.00 |
| Calsoft F wetting agent | 0.08 | 0.08 | 0.08 | 0.08 |
| 45% formalin | 25.8 | 25.3 | 25.3 | 26.1 |
| Triethylamine | 0.86 | 1.08 | 0.86 | 0.85 |
| Zinc oxide | 3.17 | 3.13 | 3.13 | 3.13 |
| Salicylic acid | 15.00 | 15.00 | 15.00 | 15.00 |
| Water | 10.00 | 10.2 | 10.2 | 0 |
| Siponic F-300 (70%) Emulsifying Agent | 1.4 | 1.92 | 1.92 | 0 |
| Hot 25% Aqueous Polyvinyl Alcohol | 25.0 | 20.8 | 25.0 | 0 |
| Hot Water | 70.3 | 77.2 | 78.2 | 0 |
| Ammonia solution (28%) | 0 | 0 | 2.66 | 0 |
| Resin Properties | | | | |
| Melting Range °C. (Shrink and Clear) | 72–82 | 72–84 | 74–83 | 81–91 |
| Softening Point °C. (Ball and Ring) | 101 | 105 | 102 | 110 |
| Percent Insoluble in Toluene | 0.08 | — | — | 0.08 |
| Percent Free Salicylic Acid/Salicylate by HPLC | — | — | — | 0.7 |
| Emulsion Properties | | | | |
| Viscosity centipoises at 25° C.[a] | 3800 | 1050 | 2100 | |
| ASTM Solids at 105° C., percent | 48.0 | 51.2 | 49.3 | |
| Active Solids, percent | 44.6 | 48.0 | 45.9 | |
| pH | 4.3 | 4.5 | 6.1 | |
| Mean particle size (microns)[b] | 2.2 | 2.5 | 3.8 | |
| Percent of particles >10μ | 0 | 0.4 | 0.4 | |
| Stability | | | | |
| one day after preparation | Stable No Sediment | Stable No Sediment | Stable No Sediment | |
| several weeks after preparation | Stable No Sediment | Stable No Sediment | Stable No Sediment | |

[a]Brookfield viscosity using #4 spindle at 20 P.R.M.
[b]Determined by Coulter Counter

TABLE 2

| Example No. | 5 | 6 | 7 | 8 | 9 | 10 | 11 |
|---|---|---|---|---|---|---|---|
| Formulation (parts) | | | | | | | |
| para-Nonylphenol | 86.00 | 85.00 | 86.00 | 85.00 | 85.00 | 85.00 | 97.3 |
| Calsoft F wetting agent | 0.08 | 0.08 | 0.08 | 0.08 | 0.09 | 0.10 | 0.11 |
| Zinc oxide | 3.54 | 3.54 | 3.54 | 3.54 | 3.54 | 3.54 | 1.08 |
| Propionic Acid | 1.61 | 1.61 | 1.61 | 1.61 | 0 | 1.61 | 0 |
| P-Toluene Sulfonic Acid | 0 | 0 | 0 | 0 | 1.84 | 0 | 0 |
| 45% formalin | 25.25 | 25.25 | 25.25 | 25.25 | 25.74 | 25.4 | 21.3* |
| 25% Aqueous Sodium Hydroxide | 3.06 | 3.06 | 3.06 | 3.06 | 3.06 | 3.06 | 0 |
| Salicylic Acid | 14.00 | 15.00 | 14.00 | 15.00 | 15.00 | 15.00 | 2.7 |
| Water | 15.3 | 13.8 | 13.8 | 13.8 | 15.3 | 0 | 141.1 |
| Siponic F-300 (70%) Emulsifying Agent | 1.43 | 1.43 | 1.43 | 1.43 | 1.49 | 0 | 0 |
| A-246 Emulsifying Agent | 0 | 0 | 0 | 0 | 0 | 0 | 3.2 |
| Hot 25% Aqueous Polyvinyl Alcohol | 20.8 | 25.0 | 25.0 | 25.0 | 25.0 | 0 | 40.0 |
| Hot water | 86.5 | 86.5 | 86.5 | 86.5 | 96.3 | 0 | 0 |
| Triethylamine | 0 | 0 | 0 | 1.06 | 0 | 0 | 0 |
| Resin Properties | | | | | | | |
| Melting Point °C. (Shrink and Clear) | 80–90 | 77–87 | 74–85 | 78–87 | 75–86 | 73–83 | 64–73 |
| Softening Point °C. (Ball and Ring) | 100–110 | 104–105 | 103 | 108–109 | 114–114.5 | 108 | 90 |
| Percent Insoluble in Toluene | — | 0 | — | — | — | — | — |
| Percent Free Salicylic Acid/Salicylate by HPLC | — | 0.5 | — | — | — | — | — |
| Emulsion Properties | | | | | | | |
| Viscosity, centipoises at 25° C.[a] | 2950 | 2950 | 3880 | 2100 | 3250 | | 5600 |
| ASTM Solids at 105° C., percent | 49.1 | 45.2 | 44.1 | 50.6 | 43.6 | | 38.3 |

TABLE 2-continued

| Example No. | 5 | 6 | 7 | 8 | 9 | 10 | 11 |
|---|---|---|---|---|---|---|---|
| Active Solids, percent | 46.1 | 42.0 | 40.9 | 47.0 | 40.5 | — | |
| pH | 5.7 | 5.6 | 5.4 | 6.2 | 5.2 | | 5.9 |
| Mean particle size (microns)[b] | 4.0 | 2.2 | 3.0 | 3.1 | 3.7 | | 4.0 |
| Percent of particles >10μ | 0.3 | 0 | 3.7 | 0 | 0 | | — |
| Stability | | | | | | | |
| one day after preparation | Stable No Sediment | Stable No Sediment | Stable No Sediment | Stable No Sediment | Stable No Sediment | | |
| several weeks after preparation | Stable No Sediment | Stable No Sediment | Stable No Sediment | Stable No Sediment | Stable No Sediment | | |

*50% formalin
[a] Brookfield viscosity using #4 spindle at 20 R.P.M.
[b] Determined by Coulter Counter

EXAMPLES 12 to 14

Example 5 was repeated using in place of propionic acid the following acids which form the indicated salts upon reaction with zinc oxide.

| Example No. | Acid | Salt |
|---|---|---|
| 12 | Formic Acid | Zinc diformate |
| 13 | Acetic Acid | Zinc diacetate |
| 14 | Salicylic Acid | Zinc disalicylate |

EXAMPLES 15, 16 and 17

For purposes of comparison, color developer resins were produced in accordance with Stolfo U.S. Pat. No. 4,173,684.

In Example 15, the method of Example 3 of the patent was employed with para-nonylphenol as the substituted phenol. A reactor was charged with p-nonylphenol (545 g., 2.48 moles), salicylic acid (92 g., 0.67 mole) and oxalic acid (64 g., 10% by weight on phenol plus salicylic acid). The reactants were heated to about 90° C. and 45% aqueous formaldehyde solution (189 g., 2.84 moles) added. The mixture was refluxed for 4 hours, and then the water stripped off under a vacuum of 25 inches of mercury at 120° C. The resin was blanketed with nitrogen gas and heated to 190° C. for one hour. A considerable amount of solid condensate collected on the apparatus consisting of both salicylic acid and oxalic acid. The resin was cooled to 130° C., and a mixture of zinc dipropionate (85 g.) and ammonium bicarbonate (130.3 g.) added to the stirred material. The temperature was raised to 165° C. for 1 hour and then cooled and ground. It had a m.p. of 69°–79° C. and a Ball and Ring softening point of 107° C.

Example 16 is a substantial duplication of preparation of resin according to Example 3 of U.S. Pat. No. 4,173,684. A reactor was charged with p-tert-octylphenol (412 g., 2 moles), salicylic acid (92 g., 0.67 moles) and oxalic acid (50.4 g.). The reactants were heated to 90° C. and 45% aqueous formaldehyde solution (15 g., 2.38 moles) added. The mixture was refluxed for 4 hours and then water stripped off under 25 inches of mercury vacuum at 120° C. The resin was blanketed with nitrogen and heated to 190° C. for 1 hour. It was then cooled to 130° C. and a mixture of zinc dipropionate (67.0 g.) and ammonium bicarbonate (93.6 g.) added to the stirred material. The temperature was raised to 164° C. for one hour and then cooled and ground. The m.p. was 91°–103° C. and Ball and Ring softening point 120° C.

In Example 17, the method was a duplication of Example 1 of U.S. Pat. No. 4,173,684. Five samples were taken for infra-red analysis at the points in the process denoted by Samples Numbers. A reaction kettle was charged with p-tert-octyl phenol (309 g., 1.5 moles), p-tert-butyl-phenol (225 g., 1.5 moles) and salicylic acid (138 g., 1.0 moles). The dry powders were heated and oxalic acid (67.2 g., 10% on weight of phenol plus salicylic acid) added. A 37% aqueous formaldehyde solution (239.0 g., 3 moles) was added and the mixture refluxed for 6 hours until the formaldehyde had reacted. (Sample 17-1) The water was stripped under aspirator vacuum to 120° C. (Sample 17-2 was taken during dehydration at 120° C.) Vacuum dehydration was continued and the mixture was heated to 190° C. and held for 1 hour. (Sample 17-3) The mixture was cooled to 130° C. and zinc dipropionate (89.3 g.) and ammonium bicarbonate (166.4 g.) added with stirring. (Sample 17-4) The temperature was finally raised to 165° C. and held for 1 hour. (Sample 17-5) The resinous product had the properties shown in Table 3.

EXAMPLE 18

Conversion of solid resins of Examples 15 and 16 to emulsions.

The crushed resin (200 g.) was heated, under nitrogen, with water (25 g.) and Siponic F-300 surfactant (2.86 of 70% aqueous solution) to 90° C. with stirring. When the melt was homogeneous hot 25% aqueous polyvinyl alcohol solution (48 g.) was added and stirring continued for 20 minutes, while the temperature was maintained at 90°–95° C. Hot water (168 g.) was finally added and the stirring rate increased at 95° C. for 0.5 hour. Finally the emulsion was cooled, filtered through cheesecloth and stored. Resin and emulsion properties are shown in Table 3.

Following are differences observed between the resin product and process of the invention and of Stolfo.

The resin products of the invention were found to be readily emulsifiable so that useful coating slurries were readily obtained. Moreover, the emulsions of the invention were storage stable and did not precipitate sediment over a period of time. By contrast, the resin products produced in accord with the Stolfo patent were found to be difficult to emulsify and the emulsions were not stable. Unacceptable amounts of solids settled out on standing. The particle size distribution was unacceptably broad.

During the preparation of the resins using the Stolfo methods, it was observed that during the dehydration of the resin, solid materials condensed on the apparatus downstream from the dehydration vessel. These condensate contained salicylic acid and other materials. No such condensates were observed when conducting the processes of the invention.

Some of the resins were analyzed for free salicylic acid and toluene insolubles as described in Example 1. The resins made by the Stolfo process had commercially unacceptable levels of toluene insolubles. The levels of free salicylic acid or salicylate salt in the Stolfo products indicated that the salicylic acid was not being completely reacted into the resin structure. This result is borne out by the infra-red results presented hereinafter.

TABLE 3

| Example No. | 15 | 16 | 17 |
|---|---|---|---|
| Resin Properties | | | |
| Melting Range °C. (Shrink and Clear) | 69–79 | 91–103 | 92–99 |
| Softening Range °C. (Ball and Ring) | 107 | 120 | 113–114 |
| Percent Insoluble in Toluene | 3.0 | 2.0 | 0.48 |
| Percent Free Salicylic Acid/Salicylate by HPLC | — | — | 3.9 |
| Emulsion Properties | | | |
| Viscosity, Centipoises @ 25° C.[a] | — | — | |
| ASTM Solids at 105° C. | 48.4 | 46.0 | |
| Active Solids, percent | 45.4 | 46.0 | |
| pH | 7.0 | 7.1 | |
| Mean Particle Size (microns)[b] | 12.5 | 7.8 | |
| Percent of particles >10μ | 47.5 | 34.6 | |
| Stability, one day after preparation | Sediment Observed | Sediment Observed | |

The emulsions of the foregoing examples were blended with the following components to produce coating slurries:

Coating slurry formulation 64 parts Kaolin clay
3 parts Calcium carbonate
5.4 parts Colloidal silica
3 parts Hydroxyethyl starch
12 parts Styrene-butadiene latex
12 parts Resin emulsion (based on 45% active solids)

Water was added to yield a slurry solids content of 30%.

Coating Procedure

The coating slurry was applied to the surface of bond paper, using a No. 6 coating rod to provide a final coat weight of about 6 gsm. The coated paper was dried for 2 minutes on a steam-heated drum dryer. The coated papers were tested and found to have the properties shown in Table 4.

TABLE 4

CF PAPERS CONTAINING RESINS

| Example No. | Coat Wt. g.s.m. | Print Speed C.I. (1 minute) (2) | Print Speed ΔL (1 minute) (2) | Light Fade (T.I.) Initial T.I. (3) | Light Fade (T.I.) 3 Hrs/ UV | Light Fade (T.I.) ΔL | Light Decline T.I. | Light Decline ΔL (4) | Solvent Decline Initial (5) | Solvent Decline Decline |
|---|---|---|---|---|---|---|---|---|---|---|
| 1 | 6.2 | 82.0 | 18.0 | 63.7 | 76.8 | 13.1 | 82.8 | 19.1 | 63.0 | 63.8 |
| 2 | 6.2 | 81.6 | 18.4 | 61.3 | 65.5 | 4.2 | 76.5 | 15.2 | 62.4 | 61.0 |
| 3 | 6.2 | 83.8 | 16.2 | 65.0 | 68.1 | 3.1 | 79.9 | 14.9 | 66.6 | 63.0 |
| 5 | 6.2 | 83.8 | 16.2 | 66.6 | 79.7 | 13.1 | 81.9 | 15.3 | 64.1 | 63.4 |
| 6 | 6.2 | 81.4 | 18.6 | 60.5 | 65.9 | 5.4 | 76.0 | 15.5 | 61.2 | 62.8 |
| 7 | 6.2 | 81.7 | 18.3 | 61.1 | 66.4 | 5.3 | 75.5 | 14.4 | 62.1 | 63.2 |
| 8 | 5.9 | 84.8 | 15.2 | 63.7 | 69.2 | 5.5 | 73.6 | 9.9 | 61.1 | 59.9 |
| 9 | 5.9 | 84.2 | 15.8 | 63.2 | 69.1 | 5.9 | 75.1 | 11.9 | 60.9 | 60.1 |
| 15 | 6.2 | 87.9 | 12.1 | 71.6 | 89.1 | 17.5 | 86.3 | 14.7 | 69.6 | 71.3 |
| 16 | 6.2 | 94.5 | 5.5 | 83.1 | 90.6 | 7.5 | 89.9 | 6.8 | 82.3 | 72.3 |

NOTES TO TABLE 4
1. All CF papers were tested against blue (CVL) CB Paper
2. Print speed determined by calender intensity test at 1 minute after imaging.

$CI = \frac{Lt \times 100}{Lo}$ where Lt = reflectance of 1-minute image
Lo = reflectance of un-imaged paper ΔL = (100 - CI)= intensity due to the image developed
3. Light fade test by typewriter intensity. CF imaged and reflectance measured after 1 Hr. T.I. $= \frac{Lt \times 100}{Lo}$ Paper exposed to U.V. light for 3 hrs. then re-imaged. After 1 hr. the reflectance values for faded initial image, and new image are measured.
ΔL gives difference between image before and after 3 hrs. U.V. exposure (fade)
4. ΔL gives difference between image on unexposed and exposed paper. (decline)
5. T.I. intensity measured on CF paper before and after 1 hour storage in a saturated atmosphere of toluene.

The performance data tabulated in Table 4, show that the copy papers or record sheets of the invention prepared in Examples 1 to 3 and 5 through 9 had superior print speed, light fade, light decline and solvent decline when compared with the data obtained in Examples and 16 where the color developers were prepared in accord with Stolfo U.S Pat. No. 4,173,684.

Results of Infrared Analyses of Samples Taken in Examples 10 and 17

The samples taken during Examples 10 and 17 were subjected to analysis by Fourier Transform Infra Red. The results are shown in Tables 5 and 6. The instrument used was a Nicolet 7199 Fourier Transform Infra Red which has a resolution of two wave numbers and 3% limit on detectability.

Briefly, it is believed that the process of the invention, as illustrated in Example 10, proceeds by first incorporating formaldehyde as methylol and dimethylene ether structures onto the p-alkylphenol under the influence of zinc dipropionate salt. Salicylic acid is charged as the free acid but is rapidly consumed and detectable only in its (zinc) salicylate salt form. Upon continued heating, major thermal rearrangements take place during which time the (zinc) salicylate is consumed into the alkylphenol-formaldehyde polymer via nuclear substitution of the salicylate ring to form an alkylphenol-formaldehyde-salicylate polymer.

Briefly, by comparison, it is believed that the Stolfo route of resin manufacture shown in Example 17 proceeds by first incorporating formaldehyde as methylene structures onto the p-alkyl-phenol and perhaps some of the salicylic acid, under the influence of the oxalic acid catalyst. Free, unreacted, monomeric salicylic acid is readily detected at a significant level after the formaldehyde is consumed. The sample is devoid of methylol and dimethylene ether structures. Except for several minor changes, the material remains substantially unchanged during extended heating to high temperatures (190 degrees). Free, monomeric salicylic acid is still strongly evident. Upon addition of zinc dipropionate and ammonium carbonate, major changes do occur. Evidence of (zinc) salicylate, most probably through the disassociation of zinc dipropionate, is detectable. Evidence of free, unreacted salicylic acid is gone. By the end of the reaction sequence, free, unreacted (zinc) salicylate is still present.

Structural differences between the final resin product of the invention (Sample 10-4) and the resin product may indicate that the Stolfo resin has lower molecular weight species. In the Sample 10-4, the 785 band has appeared, indicating nuclear substituted salicylate is present in the product of the invention. By contrast, the absence of the 785 band in the Stolfo product, is indicative that the salicylic acid may not be reacted into the polymer molecule in the resin product of Stolfo.

As evidenced in numerous ways by the analysis, resin produced via the method of the invention is substantially different from that of the Stolfo route of Example 17. Additionally, intermediate compositions of the respective reaction sequences have shown striking dissimilarities.

It is believed that the foregoing data show that the novel resin, and the method for its preparation, resulted from better and more complete incorporation of salicylic acid, not as a simple salt but polymerically bound within the alkylphenol-formaldehyde polymer matrix.

TABLE 5

| Band | Assignment |
|---|---|
| Sample 10-1 | |
| 830 | 1,4-aromatic substitution; p-nonylphenol. |
| 1010 | Methylol substitution on aromatic ring. |
| 1060–1070 | Benzyl ether C—O—C structure on aromatic ring. |
| 1560 | Carbonyl frequency due to propionic acid, however, no free —COOH observed. Propionic present as (zinc) propionate salt. |
| Sample 10-2 | |
| 1560 | Carbonyl of propionate salt is weaker; could be due to dilution effect of NaOH and salicylic acid additions |
| 1530–1680 | General broadening of bands of aromatic region due principally to salicylic acid at 1600; however, salicylic not present as free acid (—COOH) form but as a (zinc) salicylate salt. |
| 1010 | Methylol substitution getting weaker. May be due to dilution effect as noted above for 1560 band. |
| 1060–1070 | Benzyl ether bands getting stronger |
| 850 | Absent. Indicating no free salicylic acid. |
| Sample 10-3 | |
| 1060–1070 | Further increase in strength of benzyl ether bands. |
| 1010 | Further decrease in methylol band. |
| 1600 | (Zinc) salicylate band is slowly changing from a sharp peak (indicating free, unreacted salt) to a broader band indicating polymerization. |
| 700–900 | Fingerprint region for zinc salicylate is getting weaker showing disappearance of free salt at 705. |
| Sample 10-4 | |
| 1600 region | Extreme changes occurred throughout entire spectrum. This region is much broader. Unique aromatic species have been formed indicating polymerization. |
| 1010 | Methylol components have disappeared from the spectrum. |
| 1060–1070 | Benzyl ether components have disappeared from the spectrum. |
| 705 | Band due to (zinc) salicylate free salt is gone. Zinc and salicylic acid are no longer present as (zinc) salicylate. |
| 916–918 | Bands due to —CH$_2$— bridgings (novolak) structures are visible. |
| 818 | 1,2,4-substitution pattern is predominant. |
| 830 | 1,4-substitution from p-nonylphenol is essentially gone. |
| 785 | 1,2,6-substitution from nuclear substituted salicylate is present. |
| 875 | Strong band indicating 1,2,4,6-aromatic substitution from disubstituted p-nonylphenol and disubstituted salicylate. |
| Sample 10-5 | Very little to no difference compared to Sample 10-4. | made in accordance with the Stolfo patent (Sample 17-5) can be seen by comparing the 705 bands. In Sample 10-4, the salicylate salt is gone. But in Sample 17-5, a considerably amount of free, unreacted salicylate is present. The 875 band is dominant in Sample 10-4, but much less so in Sample 17-5. The presence of 1,2,4,6-substitution indicates the presence of disubstituted p-nonyl phenol and/or disubstituted salicylic acid. This

TABLE 6

| Band | Assignment |
|---|---|
| Sample 17-1 | |
| 1010 | Absent. No Methylol structure present. |

TABLE 6-continued

| Band | Assignment |
|---|---|
| 850 | Medium strength and sharp, indicating free salicylic acid. |
| 1060–1070 | Absent. No Benzyl Ether structure present. |
| 916,922 | Methylene bridging (novolak) structures present. |
| 1660 | Very strong band due to carbonyl of free, unreacted salicylic acid. |
| 758,818, 875 | 1,2- 1,2,4- and 1,2,4,6 aromatic substitutions are about equal in intensity. |
| Sample 17-2 | |
| 1750 | New band, possibly due to a carbonyl has appeared as a weak component, source unknown. |
| 1590 | Very small change occurring compared to Sample 17-1 in the aromatic substitution pattern. Otherwise, this spectrum is almost identical to that of Sample 17-1. |
| Sample 17-3 | |
| 705 | Still absent, indicating no salicylic acid is in the salicylate (salt) form. |
| 850 | Free salicylic acid still present. |
| 1660 | Strong band due to salicylic acid carbonyl still present. |
| 1750 | Band identified in Sample 17-2 as possibly a carbonyl has reduced to the limit of detectability. |
| 1600 (doublet) | Shape is changing indicating changes in carbonyl frequencies. Unknown cause. |
| 1210, 1240 | Bands due to C—O stretch of phenolic component previously at about 1:1 ratio, now show 1210 band is stronger. Cause unknown. |
| Sample 17-4 | |
| 850, 1660 | Bands due to free, monomeric salicylic acid are gone. |
| 705 | (Zinc) salicylate band appears. |
| 1560 | New band, possibly due to carbonyl of a propionate salt. |
| 1630 | New band, unassigned. |
| 1210, 1240 | C—O stretch of phenolic component. Strengthened 1210 band of Sample 17-3 now has decreased by 50%. 1240 band unchanged. |
| 700–900 | Fingerprint region still shows strong resemblance to Sample 17-3. Not much change in substitution pattern vs. Sample 17-3. |
| Sample 17-5 | |
| 1630 | Stronger than in Sample 17-4. Still unassigned. |
| 1655 | New band. Could be a carbonyl that was frequency shifted down from higher regions or could possibly be an amide. |
| 705 | Medium-strong absorption indicating considerable mount of free, unreacted (zinc) salicylate salt still present. |
| 818,875 | 1,2,4-aromatic substitution is dominant with some 1,2,4,6 present. This is similar to Sample 17-1. Otherwise, spectra of Sample 17-5 is identical to that of Sample 17-4. |
| 916,922 | Methylene bridging (novolak) structures are identical to those of Sample 17-1. |

What is claimed is:

1. A metal-modified phenolic resin which comprises a reaction product of:
   (a) a substantially non-novolak oligomer of a phenol, which does not contain a carboxyl group, and an aldehyde;
   (b) an aromatic carboxylic acid; and
   (c) a metal-containing compound, said oligomer having at least one reactive group thereon for reacting with said aromatic carboxylic acid.

2. A metal-modified phenolic resin according to claim 1 wherein said phenol is a para-substituted phenol and wherein said aldehyde is formaldehyde.

3. A metal-modified phenolic resin according to claim 2 wherein said aromatic carboxylic acid is a salicylic acid.

4. A metal-modified phenolic resin according to claim 3 wherein said metal-containing compound is zinc oxide.

5. A metal-modified phenolic resin according to claim 4 wherein said para-substituted phenol is para-butyl phenol, para-octyl phenol, para-nonyl phenol, or para-phenyl phenol; and wherein said aromatic carboxylic acid is salicylic acid.

6. A metal-modified phenolic resin according to claim 5 wherein said oligomer contains on the average between about one to four phenol radicals.

7. A metal-modified phenolic resin which comprises a reaction product of:
   (a) a substantially non-novolak oligomer of a parasubstituted phenol, which does not contain a carboxyl group, and formaldehyde;
   (b) salicylic acid; and
   (c) zinc oxide,
said oligomer having at least one reactive group thereon for reacting with said salicylic acid.

8. A metal-modified phenolic resin according to claim 7 wherein said para-substituted phenol is para-nonyl phenol.

9. A metal-modified phenolic resin according to claim 8 wherein said salicylic acid is present in an amount about 1 to 25 percent by weight based on the weight of the para-nonyl phenol and salicylic acid.

10. A metal-modified phenolic resin according to claim 9 wherein said salicylic acid is present in an amount about 10 to 18 percent by weight based on the weight of the para-nonyl phenol and salicylic acid.

11. A metal-modified phenolic resin according to claim 8 wherein the zinc in said zinc oxide is present in an amount about 0.5 to 10 percent by weight based on the weight of the para-nonyl phenol and salicylic acid.

12. A metal-modified phenolic resin according to claim 11 wherein the zinc in said zinc oxide is present in an amount about 2 to 5 percent by weight based on the weight of the para-nonyl phenol and salicylic acid.

13. A metal-modified phenolic resin according to claim 8 wherein said salicylic acid is present in an amount about 10 to 18 percent by weight and wherein the zinc in said zinc oxide is present in an amount about 2 to 5 percent by weight, both based on the weight of the para-nonyl phenol and salicylic acid.

14. An emulsion, suitable for use in a color developer of a pressure sensitive recording paper system, which comprises an emulsion of the metal-modified phenolic resin of claim 1 in an aqueous medium.

15. An emulsion, suitable for use in a color developer of a pressure sensitive recording paper system, which comprises an emulsion of the metal-modified phenolic resin of claim 4 in an aqueous medium.

16. An emulsion, suitable for use in a color developer of a pressure sensitive recording paper system, which comprises an emulsion of the metal-modified phenolic resin of claim 7 in an aqueous medium.

17. An emulsion, suitable for use in a color developer of a pressure sensitive recording paper system, which comprises an emulsion of the metal-modified phenolic resin of claim 13 in an aqueous medium.

18. A color developer material for coating onto a paper substrate in a pressure sensitive recording paper system, said color developer material comprising a metal-modified phenolic resin which comprises a reaction product of:
 (a) a substantially non-novolak oligomer of a phenol, which does not contain a carboxyl group, and an aldehyde;
 (b) an aromatic carboxylic acid; and
 (c) a metal-containing compound,
said oligomer having at least one reactive group thereon for reacting with said aromatic carboxylic acid.

19. A color developer material according to claim 18 wherein said phenol is a para-substituted phenol; wherein said aldehyde is formaldehyde; wherein said aromatic carboxylic acid is a salicylic acod; and wherein said metal-containing compound is zinc oxide.

20. A color developer material according to claim 19 wherein said para-substituted phenol is para-nonyl phenol; and wherein said aromatic carboxylic acid is salicylic acid.

21. A color developer material according to claim 20 wherein said oligomer contains on the average between about one to four phenol radicals.

22. A color developer material for coating onto a paper substrate in a pressure sensitive recording paper system, said color developer material comprising a metal-modified phenolic resin which comprises a reaction product of:
 (a) a substantially non-novolak oligomer of a para-substituted phenol, which does not contain a carboxyl group, and formaldehyde;
 (b) a salicylic acid; and
 (c) zinc oxide,
said oligomer having at least one reactive group thereon for reacting with said salicylic acid.

23. A color developer material according to claim 22 wherein said salicylic acid is present in an amount about 10 to 18 percent by weight, and wherein the zinc is said zinc oxide is present in an amount about 2 to 5 percent by weight, both based on the weight of the para-nonyl phenol and salicylic acid.

24. A pressure sensitive recording paper system comprising a paper substrate having a coating of a color developer material thereon, said color developer material comprising a metal-modified phenolic resin which comprises a reaction product of:
 (a) a substantially non-novolak oligomer of a phenol, which does not contain a carboxyl group, and an aldehyde;
 (b) an aromatic carboxylic acid; and
 (c) a metal-containing compound,
said oligomer having at least one reactive group thereon for reacting with said aromatic carboxylic acid.

25. A pressure sensitive recording paper system according to claim 24 wherein said phenol is a para-substituted phenol; wherein said aldephyde is formaldehyde; wherein said aromatic carboxylic acid is a salicylic acid; and wherein said metal-containing compound is zinc oxide.

26. A pressure sensitive recording paper system according to claim 25 wherein said para-substituted phenol is para-nonyl phenol; and wherein said aromatic carboxylic acid is salicylic acid.

27. A pressure sensitive recording paper system according to claim 26 wherein said oligomer contains on the average about one to four phenol radicals.

28. A pressure sensitive recording paper system comprising a paper substrate having a coating of a color developer material thereon, said color developer material comprising a metal-modified phenolic resin which comprises a reaction product of:
 (a) a substantially non-novolak oligomer of a para-substituted phenol, which does not contain a carboxyl group, and formaldehyde;
 (b) a salicylic acid; and
 (c) zinc oxide,
said oligomer having at least one reactive group thereon for reacting with said salicylic acid.

29. A pressure sensitive recording paper system according to claim 28 wherein said salicylic acid is present in an amount about 1 to 25 percent by weight, and wherein the zinc in said zinc oxide is present in an amount about 0.5 to 10 percent by weight, both based on the weight of the para-nonyl phenol and salicylic acid.

30. A pressure sensitive recording paper system according to claim 29 wherein said salicylic acid is present in an amount about 10 to 18 percent by weight, and wherein the zinc in said zinc oxide is present in an amount about 2 to 5 percent by weight, both based on the weight of the para-nonyl phenol and salicylic acid.

31. A process for preparing a metal-modified phenolic resin which comprises reacting:
 (a) a substantially non-novolak oligomer of a phenol, which does not contain a carboxyl group, and an aldehyde;
 (b) an aromatic carboxylic acid; and
 (c) a metal-containing compound,
said oligomer having at least one reactive group thereon for reacting with said aromatic carboxylic acid.

32. A process according to claim 31 wherein said phenol is a para-substituted phenol; wherein said aldehyde is formaldehyde; wherein said aromatic carboxylic acid is a salicylic acid; and wherein said metal-containing compound is zinc oxide.

33. A process according to claim 32 wherein said para-substituted phenol is para-butyl phenol, para-octyl phenol, para-nonyl phenol, or para-phenyl phenol; and wherein said aromatic carboxylic acid is salicylic acid.

34. A process for preparing a metal-modified phenolic resin which comprises:
 (1) reacting a para-substituted phenol, which does not contain a carboxyl group, with an aldehyde in the presence of a catalyst to produce a substantially non-novolak oligomer, and
 (2) reacting said oligomer with a salicylic acid and a metal oxide to produce a metal-modified phenolic resin.

35. A process according to claim 34 wherein said para-substituted phenol is para-nonyl phenol; wherein said aldehyde is formaldehyde; wherein said salicylic acid is salicylic acid; and wherein said metal oxide is zinc oxide.

36. A process according to claim 35 wherein said salicylic acid is present in an amount about 1 to 25 percent by weight, and wherein the zinc in said zinc oxide is present in an amount about 0.5 to 10 percent by weight, both based on the weight of the para-nonyl phenol and salicylic acid.

37. A process according to claim 35 wherein said salicylic acid is present in an amount about 10 to 18 percent by weight, and wherein the zinc in said zinc oxide is present in an amount about 2 to 5 percent by weight, both based on the weight of the para-nonyl phenol and salicylic acid.

38. A process according to claim 31 wherein said phenol is a para-substituted phenol; wherein said aldehyde is formaldehyde; and wherein said oligomer is prepared by the reaction of said para-substituted phenol with formaldehyde under conditions favoring the formation of a resole-type oligomer.

39. A process according to claim 38 wherein said para-substituted phenol is para-butyl phenol, para-octyl phenol, para-nonyl phenol, or para-phenyl phenol; and wherein said reaction conditions favoring the formation of a resole-type oligomer comprise a reaction temperature of about 50°–100° C. in the presence of an alkaline catalyst.

40. A process according to claim 39 wherein said alkaline catalyst is an alkali metal hydroxide or a tertiary amine.

41. A process according to claim 40 wherein said para-substituted phenol is para-nonyl phenol; wherein said reaction temperature is about 70°–100° C.

42. A process according to claim 41 wherein said reaction temperature is about 100° C.

43. A process according to claim 39 wherein said aromatic carboxylic acid is salicylic acid; wherein said metal-containing compound is zinc oxide; and wherein said resole-type oligomer is reacted with said salicylic acid and zinc oxide at a pH for the reacting mixture of less than 7.0 and at a reaction temperature of up to about 165° C.

44. A process according to claim 43 wherein said reaction temperature is initially maintained at about 100° C. and subsequently raised to about 150°–165° C. under a partial vacuum.

45. A process according to claim 31 wherein said phenol is a para-substituted phenol; wherein said aldehyde is formaldehyde; and wherein said oligomer is prepared by the reaction of said para-substituted phenol with formaldehyde under conditions favoring the formation of a benzyl ether-type oligomer.

46. A process according to claim 45 wherein said para-substituted phenol is para-butyl phenol, para-octyl phenol, para-nonyl phenol, or para-phenyl phenol; and wherein said reaction conditions favoring the formation of a benzyl ether-type oligomer comprise a reaction temperature of about 100° C. or less in the presence of a metal salt catalyst.

47. A process according to claim 46 wherein said para-substituted phenol is para-nonyl phenol; wherein said reaction temperature is about 100° C.; and wherein said metal salt catalyst is a zinc salt.

48. A process according to claim 47 wherein said zinc salt is a salt of a carboxylic acid containing about 1–12 carbon atoms.

49. A process according to claim 47 wherein said zinc salt of a carboxylic acid is zinc diformate, zinc diacetate, zinc dipropionate, or zinc disalicylate.

50. A process according to claim 49 wherein said zinc dipropionate is formed in situ by zinc oxide and propionic acid.

51. A process according to claim 45 wherein said aromatic carboxylic acid is salicylic acid; wherein said metal-containing compound is zinc oxide; and wherein said benzyl ether-type oligomer is reacted with said salicylic acid and zinc oxide at a reaction temperature of up to about 165° C.

52. A process according to claim 51 wherein said reaction temperature is initially maintained at about 100° C. and subsequently raised to about 150°–165° C. under a partial vacuum.

53. A method for emulsifying the metal-modified phenolic resin of claim 1 which comprises mixing said resin with a first emulsifying agent and an aqueous medium to obtain a first emulsion of said aqueous medium in said resin, and mixing said first emulsion with a second emulsifying agent and additional amount of said aqueous medium to obtain a second emulsion of said resin in said aqueous medium.

54. A method for emulsifying the metal-modified phenolic resin of claim 4 which comprises mixing said resin with a first emulsifying agent and an aqueous medium to obtain a first emulsion of said aqueous medium in said resin, and mixing said first emulsion with a second emulsifying agent and additional amount of said aqueous medium to obtain a second emulsion of said resin in said aqueous medium.

55. A method for emulsifying the metal-modified phenolic resin of claim 7 which comprises mixing said resin with a first emulsifying agent and an aqueous medium to obtain a first emulsion of said aqueous medium in said resin, and mixing said first emulsion with a second emulsifying agent and additional amount of said aqueous medium to obtain a second emulsion of said resin in said aqueous medium.

56. A method for emulsifying the metal-modified phenolic resin of claim 13 which comprises mixing said resin with a first emulsifying agent and an aqueous medium to obtain a first emulsion of said aqueous medium in said resin, and mixing said first emulsion with a second emulsifying agent and additional amount of said aqueous medium to obtain a second emulsion of said resin in said aqueous medium.

57. A method for emulsifying the metal-modified phenolic resin of claim 1 which comprises mixing said resin with an emulsifying agent and an aqueous medium to obtain an emulsion of said resin in said aqueous medium.

58. A method for emulsifying the metal-modified phenolic resin of claim 4 which comprises mixing said resin with an emulsifying agent and an aqueous medium to obtain an emulsion of said resin in said aqueous medium.

59. A method for emulsifying the metal-modified phenolic resin of claim 7 which comprises mixing said resin with an emulsifying agent and an aqueous medium to obtain an emulsion of said resin in said aqueous medium.

60. A method for emulsifying the metal-modified phenolic resin of claim 13 which comprises mixing said resin with an emulsifying agent and an aqueous medium to obtain an emulsion of said resin in said aqueous medium.

61. The metal-modified phenolic resin of claim 1 wherein said oligomer is prepared by the reaction of said phenol with said aldehyde under conditions favoring the formation of a resole-type oligomer.

62. The metal-modified phenolic resin of claim 1 wherein said oligomer is prepared by the reaction of said phenol with said aldehyde under conditions favoring the formation of a benzyl ether-type oligomer.

63. An emulsion, suitable for use in a color developer of a pressure sensitive recording paper system, which comprises an emulsion of the metal-modified phenolic resin of claim 61 in an aqueous medium.

64. An emulsion, suitable for use in a color developer of a pressure sensitive recording paper system, which comprises an emulsion of the metal-modified phenolic resin of claim 62 in an aqueous medium.

65. The color developer of claim 18 wherein said oligomer is prepared by the reaction of said phenol with said aldehyde under conditions favoring the formation of a resole-type oligomer.

66. The color developer of claim 18 wherein said oligomer is prepared by the reaction of said phenol with said aldehyde under conditions favoring the formation of a benzyl ether-type oligomer.

67. The pressure sensitive recording paper system of claim 24 wherein said oligomer is prepared by the reaction of said phenol with said aldehyde under conditions favoring the formation of a resole-type oligomer.

68. The pressure sensitive recording paper system of claim 24 wherein said oligomer is prepared by the reaction of said phenol with said aldehyde under conditions favoring the formation of a benzyl ether-type oligomer.

69. A method for emulsifying the metal-modified phenolic resin of claim 61 which comprises mixing said resin with a first emulsifying agent and an aqueous medium to obtain a first emulsion of said aqueous medium in said resin, and mixing said first emulsion with a second emulsifying agent and additonal amount of said aqueous medium to obtain a second emulsion of said resin in said aqueous medium.

70. A method for emulsifying the metal-modified phenolic resin of claim 62 which comprises mixing said resin with a first emulsifying agent and an aqueous medium to obtain a first emulsion of said aqueous medium in said resin, and mixing said first emulsion with a second emulsifying agent and addional amount of said aqueous medium to obtain a second emulsion of said resin in said aqueous medium.

71. A method for emulsifying the metal-modified phenolic resin of claim 61 which comprises mixing said resin with an emulsifying agent and an aqueous medium to obtain an emulsion of said resin in said aqueous medium.

72. A method for emulsifying the metal-modified phenolic resin of claim 62 which comprises mixing said resin with an emulsifying agent and an aqueous medium to obtain an emulsion of said resin in said aqueous medium.

73. The method of claim 55 wherein said resin mixed with the first emulsifying agent and an aqueous medium is in the molten state.

74. The method of claim 73 wherein said second emulsifying agent is polyvinyl alcohol.

* * * * *